(12) United States Patent
Leinonen et al.

(10) Patent No.: US 9,160,464 B2
(45) Date of Patent: Oct. 13, 2015

(54) OPERATING MULTI-SERVICE RECEIVER IN NON-INTERFERING MANNER

(75) Inventors: Marko Leinonen, Haukipudas (FI); Niko Kiukkonen, Veikkola (FI); Jari Junell, Vantaa (FI); Pertti Kangas, Oulu (FI); Heikki Mattila, Oulu (FI); Antti Kangas, Oulunsalo (FI); Jukka Kansanaho, Tyrnävä (FI)

(73) Assignee: Nokia Technologies Oy, Espoo (FI)

( * ) Notice: Subject to any disclaimer, the term of this patent is extended or adjusted under 35 U.S.C. 154(b) by 2920 days.

(21) Appl. No.: 11/231,308

(22) Filed: Sep. 19, 2005

(65) Prior Publication Data
US 2007/0066228 A1 Mar. 22, 2007

(51) Int. Cl.
*H04M 1/00* (2006.01)
*H04B 15/02* (2006.01)
*H04B 1/3805* (2015.01)
*H04B 17/318* (2015.01)
*H04B 7/12* (2006.01)

(52) U.S. Cl.
CPC .............. *H04B 15/02* (2013.01); *H04B 1/3805* (2013.01); *H04B 17/318* (2015.01); *H04B 7/12* (2013.01); *H04B 2215/062* (2013.01)

(58) Field of Classification Search
CPC .... H04B 1/3805; H04B 17/318; H04B 15/02; H04B 7/12; H04B 2215/062
USPC ................. 455/450–450.2, 63.1, 67.11, 67.7, 455/68–70, 88, 552.1, 553.1, 226.1, 226.2, 455/226.3, 180.2
See application file for complete search history.

(56) References Cited

U.S. PATENT DOCUMENTS

| 5,631,921 | A | 5/1997 | Schilling |
| 6,385,435 | B1 * | 5/2002 | Lee ................................. 455/24 |
| 6,873,604 | B1 * | 3/2005 | Surazski et al. ............... 370/271 |

(Continued)

FOREIGN PATENT DOCUMENTS

| EP | 0 998 056 A2 | 5/2000 |
| EP | 1 253 720 A1 | 10/2002 |

(Continued)

OTHER PUBLICATIONS

"Mobile and Portable DVB-T Radio Access Interface Specification", DVB-H166, European Industry Association Information Systems Communication Technologies Consumer Electronics, EICTA / TAC / MBRAI-02-16, DRAFT, Version 0.9.1, Oct. 31, 2003, 41 pages.

(Continued)

*Primary Examiner* — Ping Hsieh
(74) *Attorney, Agent, or Firm* — Locke Lord LLP

(57) ABSTRACT

A method for operating a receiver and a device are provided. The device comprises a first and a second antenna, a receiver operationally coupled to the first antenna and a transceiver operationally coupled to the second antenna. The receiver receives information in bursts on a first band of radio frequencies. A controller of the device measures signal strength of the information received with the receiver, compares the measured signal strength to a reference value and enables operation of the transceiver if the measured signal strength is above the reference value, and limits operation of the transceiver during reception of the bursts if the measured signal strength is below the reference value.

5 Claims, 6 Drawing Sheets

(56) References Cited

U.S. PATENT DOCUMENTS

| | | | |
|---|---|---|---|
| 6,895,039 B2 * | 5/2005 | Kuzminskiy et al. | 375/150 |
| 7,242,960 B2 * | 7/2007 | van Rooyen | 455/552.1 |
| 7,269,386 B2 * | 9/2007 | Coffin, III | 455/3.02 |
| 7,310,499 B2 * | 12/2007 | Magnusson et al. | 455/69 |
| 7,313,413 B2 * | 12/2007 | Han | 455/553.1 |
| 7,313,414 B2 * | 12/2007 | van Rooyen | 455/553.1 |
| 2002/0022495 A1 * | 2/2002 | Choi et al. | 455/522 |
| 2003/0228892 A1 * | 12/2003 | Maalismaa et al. | 455/575.7 |
| 2004/0063412 A1 * | 4/2004 | Kim et al. | 455/226.2 |
| 2006/0128426 A1 * | 6/2006 | Rooyen | 455/552.1 |
| 2006/0166622 A1 * | 7/2006 | Usui et al. | 455/63.1 |

FOREIGN PATENT DOCUMENTS

| | | |
|---|---|---|
| EP | 1696576 | 8/2006 |
| JP | 2005045537 | 2/2005 |
| WO | WO03088510 | 10/2003 |

OTHER PUBLICATIONS

Supplementary European Search Report for European Application No. EP 06794115, Date of Completion of Search: Dec. 11, 2012, 2 pages.

* cited by examiner

OPERATING MULTI-SERVICE RECEIVER IN NON-INTERFERING MANNER

FIELD

The invention relates to a method and apparatus for operating a receiver configured to access multiple wireless services in a non-interfering manner. In particular, the invention relates to operating a multi-service receiver in situations where frequency bands of different services are in close proximity to one another.

BACKGROUND

The number of different wireless communication services and systems has increased during last years, and intensive development for new services is continuing. Several different cellular networks are in use. Examples of different cellular networks include GSM (Global System for Mobile communication) UMTS (Universal Mobile Telephone System) and Personal Communications Services (PCS). These networks may use different frequency bands in different parts of the world. In addition to traditional cellular telecommunication systems, other networks and services have also been developed. Examples of such services are WLAN (Wireless Local Area Network) offering wireless access to the Internet and DVB-H (Digital Video Broadcasting—Handheld) offering reception of digital television transmissions.

Many modern mobile terminals are configured to support more than one cellular network. In addition, it would be beneficial to users if the mobile terminals also supported other available wireless services.

One of the problems in designing mobile terminals supporting more than one wireless service is that the frequency bands supported by the services may be close to each other or, in some cases, even overlap. Thus, when the user of the device is receiving a first wireless service communication using a second service may cause interference to the reception of the first service.

For example in the USA, a channel for a DVB-H service is allocated at frequency band of 1670 to 1675 MHz. In Europe, the proposed frequency band allocation for the DVB-H service 470 to 702 MHz. It is also possible that future implementations in Europe and in the USA may utilize frequencies in higher UHF frequencies as well. In Europe DVB-T broadcasting frequencies are from 470 MHz up to 862 MHz. All of these frequency allocations are problematic since the cellular operation may cause strong interference to the DVB-H reception if both of these services are operated simultaneously. For example, wideband noise of a transmitter operating in a GSM900 system desensitises the uppermost DVB-H reception channels in Europe. The second harmonic of a 850 cellular band transmission (824 to 849 MHz) is on top of the DVB-H reception channel in the USA. Wideband noise of PCS band transmission (1850 to 1910 MHz) desensitises the DVB-H reception in the USA.

The interference problem is especially evident in devices supporting both DVB-H reception and cellular services. The DVB-H system requires a return channel from a mobile terminal to the DVB-H network for control purposes and charging the services. The operation of the return channel should operate simultaneously with DVB-H reception. Furthermore, a user of the device may want to send or receive short messages and make a phone call during DVB-H reception. The design of present devices provides a given antenna isolation between the antennas serving different services. However, a power level difference of signals of different services may be so high that the designed antenna isolation is insufficient.

Furthermore, the normal operation of a cellular transceiver may cause interference to the DVB-H system. A digital signal processor and digital base band integrated circuits need to have an operating frequency to work. This fundamental operating frequency or the harmonic frequencies of the fundamental operating frequencies may interference DVB-H reception. Also the connection bus or IO-signals or signaling to user interface modules of a mobile terminal may interfere DVB-H reception. The interference may be caused by fundamental operating frequency or harmonics of the fundamental bus operating frequency. Also the rising edges of the operating clock or bus or I/O signals may cause interference to the DVB-H reception.

A solution suggested in the prior art is to increase filtering in a cellular transmitter. This increases power consumption of the device, and also the price and size of the device increase. Furthermore, a cellular transceiver would not fulfil all sensitivity and radiated power requirements. Another solution is to increase the power amplifier performance of cellular transceivers. However, this would not solve all problems and would increase manufacturing costs of mobile terminals. Furthermore, if the efficiency of power amplifiers were reduced, the power consumption would increase, limiting the operating time of battery-powered terminals.

BRIEF DESCRIPTION OF THE INVENTION

An object of the invention is to provide an improved solution for operating a receiver configured to access multiple wireless services in a non-interfering manner. According to an aspect of the invention, there is provided a device comprising a first antenna and a second antenna, a receiver operationally coupled to the first antenna and a transmitter operationally coupled to the second antenna, the receiver being configured to receive information on bursts in a first band of radio frequencies, the device comprising: a first controller for measuring signal strength of the information received with the receiver, generating a notification of the reception of the receiver, the notification comprising information about the measured signal strength, and a second controller for controlling the transmitter on the basis of the notification.

According to another aspect of the invention, there is provided a device comprising a first antenna and a second antenna, a receiver operationally coupled to the first antenna and a transceiver operationally coupled to the second antenna, the receiver being configured to receive information in bursts on a first band of radio frequencies, the device comprising: a controller for measuring signal strength of the information received with the receiver, comparing the measured signal strength to a reference value, enabling operation of the transceiver if the measured signal strength is above the reference value, and limiting operation of the transceiver during reception of the bursts if the measured signal strength is below the reference value.

According to yet another aspect of the invention, there is provided in a device comprising a first antenna and a second antenna, a method for operating a receiver operationally coupled to the first antenna in combination with a transmitter operationally coupled to the second antenna, the method comprising: receiving information with the receiver on a first band of radio frequencies, measuring signal strength of the information received with the receiver, generating a notification of the reception of the receiver, the notification comprising information about the measured signal strength, and controlling the transmitter on the basis of the notification.

According to another aspect of the invention, there is provided in a device comprising a first antenna and a second antenna, a method for operating a receiver operationally coupled to the first antenna in combination with a transceiver operationally coupled to the second antenna, the method comprising: receiving information in bursts with the receiver on a first band of radio frequencies, measuring signal strength of the information received with the receiver, comparing the measured signal strength to a reference value, and if the measured signal strength is above the reference value, enabling operation of the transceiver, and if the measured signal strength is below the reference value, limiting operation of the transceiver during reception of the bursts.

The invention provides several advantages. Embodiments of the invention require only software updates in current multi-service devices. No need exists to add expensive and bulky filters to cellular transmitters. Because of the lack of filters, no extra attenuation is introduced to the cellular transmitters. Embodiments of the invention adapt easily to different situations and modes and they have a minimum effect on user experience while DVB-H service may be efficiently protected.

Embodiments of the invention reduce the interference caused by the normal operation of a cellular transceiver. Traditional solutions such as filters do not reduce this interference.

In embodiments of the invention, signal strengths of one or more signals of different services are measured. These measurements are utilized when determining whether transmissions and receptions interfere with each other. Furthermore, information about antenna isolation may be utilized. In an embodiment, antenna isolation is measured during the operation of a device. Thus, the proposed solution is adaptive to different conditions. Signal strength measurements are performed during normal operation of many receivers.

Embodiments of the invention may be applied to a terminal supporting a DVB-H service and cellular networks, but the invention may as easily be used in connection with other systems and services.

LIST OF DRAWINGS

In the following, the invention will be described in greater detail and with reference to the embodiments and the accompanying drawings, in which FIG. 1 illustrates a DVB-H reception principle;

DESCRIPTION OF EMBODIMENTS

In an embodiment, the invention is applied to DVB-H reception. A DVB-H system may also offer services other than that of digital video transmission. The DVB-H system may also offer other interactive services, such as Internet browsing, gaming services and e-commerce services.

The DVB-H system utilizes a so-called time slicing principle where data is provided for terminals in bursts. Data is transmitted in a compressed form using high throughput in short bursts which are separated by much larger gaps during which the terminal may stream data received during the previous burst. Parameters of the actual network implementation may vary but current implementations use approximately a 10% stream rate where audio and video data for about next 2 seconds is transmitted in approximately 300 ms bursts. On one hand, the burst length is limited due to a receiver synchronization time and, on the other hand, to user experience (if one burst is corrupted, the time during which no video is present becomes too long). Too long burst length may also lengthen the time required for switching from a channel to another.

Figure 1:
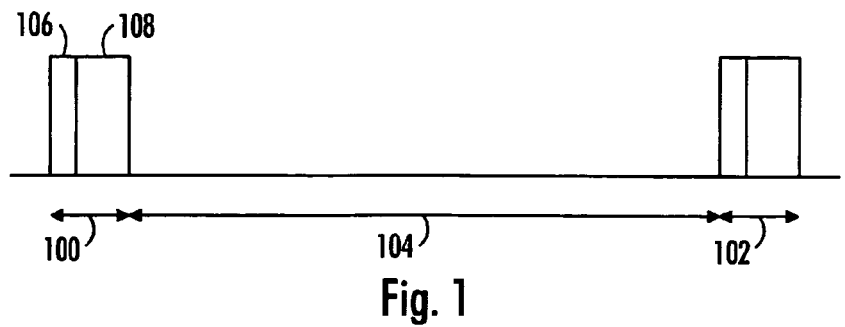

FIG. 1 illustrates the time slicing principle of DVB-H. DVB-H transmission comprises ON periods 100, 102 where bursts are transmitted, and OFF periods 104 when a receiver performs video and audio streaming. The bursts comprise a section 106 used for synchronization and a section 108 for actual data. The lengths of the ON and OFF periods are implementation-dependent. Each operator may select the lengths freely. The length of the ON period is typically selected so as to be between 100 to 500 ms, and the length of the OFF period may typically vary between 1500 to 2500 ms. Three typical cases for these network parameters are given in the following table:

| Case | ON period | OFF period |
| --- | --- | --- |
| 1 | 400 ms | 1980 ms |
| 2 | 200 ms | 1290 ms |
| 3 | 400 ms | 1090 ms |

The length of the section 106 used for synchronization is also implementation-dependent. A typical value is 80 ms.

Figure 2:
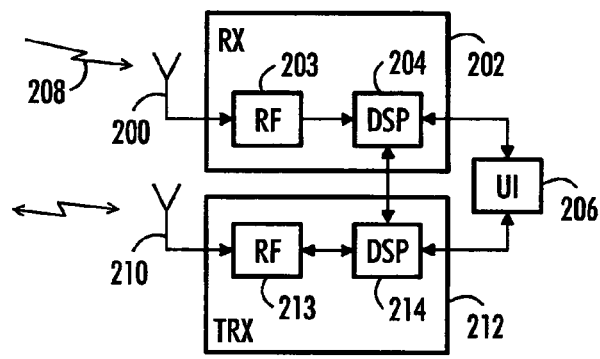
FIG. 2 shows an example of a mobile terminal to which embodiments of the invention can be applied.

With reference to FIG. 2, examine an example of a mobile terminal to which embodiments of the invention can be applied. The device comprises a first antenna 200 and a receiver 202 operationally coupled to the first antenna. The receiver comprises first radio frequency (RF) circuitry 203 and a first controller 204 operationally connected to the RF circuitry 203. The device may further comprise a user interface 206. The user interface of the device may comprise one or more displays, a keyboard, a microphone and a speaker, for example. In this example, the receiver may be a DVB-H receiver and the first controller may be a DVB-H signal processor. The receiver 202 may be configured to receive a digital video DVB-H transmission 208 and display received video transmission on a display of the user interface 206.

The device further comprises a second antenna 210 and a transceiver 212 operationally connected to the second antenna 210. The transceiver comprises a second RF circuitry 213 and a second controller 214 connected to the second RF circuitry 213 and to the user interface 206. In this example, the transceiver 212 is a cellular transceiver, such as a GSM, CDMA or WCDMA transceiver. In an embodiment, the transceiver may be configured to communicate with more than one cellular system. The transceiver may thus be configured communicate with both GSM and CDMA or WCDMA networks, for example. The transceiver may also operate on several different frequency bands supported by these networks.

The first and second antennas may be realized with one antenna element, as one skilled in the art is well aware. Likewise, the first and second controller may be implemented with one or more controllers or processors and associated software.

The design of present devices typically provides a given antenna isolation between the antennas serving different services. The antenna isolation value may depend upon antenna placement, terminal size, antenna type and the width of the frequency range each antenna covers. Typical value for antenna isolation between antennas serving different services varies around 20 dB.

Embodiments of the invention utilize antenna isolation and varying signal strengths of the different services. In some situations, different services may be operated simultaneously even if the frequency bands are close to each other. For example, the power level of the wide band noise of a PCS band transmitter is roughly 50 dB above the DVB-H minimum sensitivity level when the noise power is measured in the output of the cellular transmitter. If DVB-H signal power is more than 30 dB above the sensitivity levels, PCS transmission may be operated simultaneously with the DVB-H service without any problems. The same reasoning is also valid for the second harmonic tone of an 850 cellular band transmitter (except that the effect of the second harmonic is less severe than that of wideband noise but, on the other hand, it is at a higher power level).

In an embodiment of the invention, signal strengths of one or more signals of different services are measured. These measurements are utilized when determining whether transmissions and receptions interfere with each other. The power level of a received DVB-H signal may be measured. Respectively, the output signal strength of the transceiver 212 may be evaluated. By comparing these measurements with antenna isolation and the DVB-H sensitivity level, it is possible to determine if the transceiver 212 causes interference to the DVB-H receiver 202. If this is the case, the operation of the transceiver 212 may be controlled in different ways.

Figure 3:
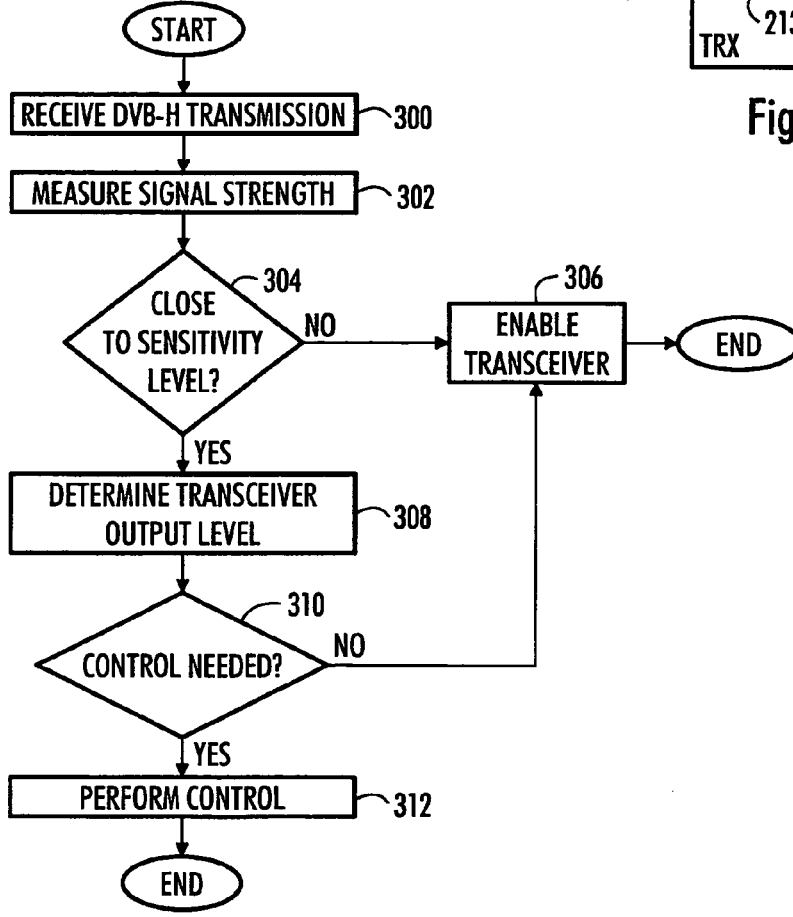
FIG. 3 illustrates an embodiment of the invention with a flowchart.

FIG. 3 is a flowchart illustrating an embodiment of the invention. In step 300, the receiver 202 is receiving DVB-H transmission in bursts in a first band of radio frequencies. In step 302, the signal strength of the received DVB-H transmission is measured. This may be measured in the receiver 202 by the first controller 204. The measurement may be an RSSI (Received Signal Strength Indication) measurement, for example.

In step 304, the first controller 204 determines whether the measured signal strength is close to the sensitivity level. If this is not the case, then it can be assumed that cellular transmission does not interfere with DVB-H reception. In step 306, the cellular transmission is enabled. This maybe executed by the first controller sending a signal to the second controller 214.

If the measured signal strength is close to the sensitivity level, then the first controller may send an appropriate signal to the second controller. The signal may comprise information about the measurement. The output signal strength of the transceiver 212 is evaluated in step 308. A second controller may perform the evaluation either by measuring the actual output power of the transmission or from the power control of transceiver 212.

In step 310, the second controller may determine whether controlling of the operation of the transceiver 212 is needed on the basis of the measured output signal strength of the transceiver 212 and the measured DVB-H signal strength. If this is not the case, the process continues from step 306.

If controlling is needed, it is performed in step 312.

Figure 4:
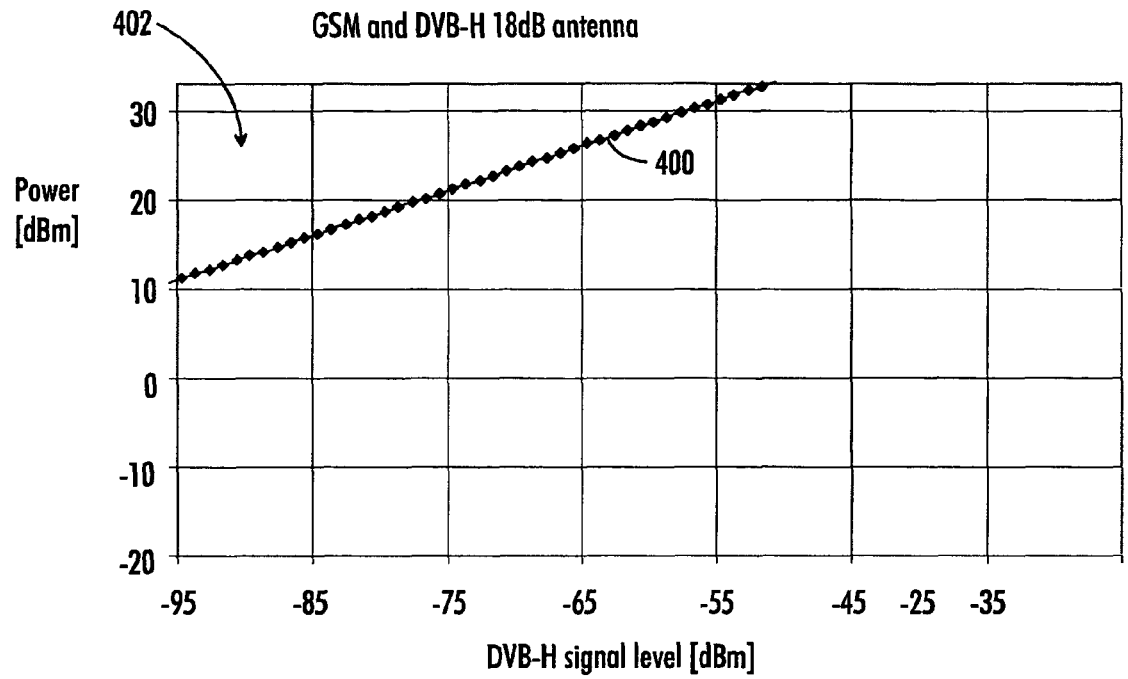
FIG. 4 illustrates an embodiment with a chart.

FIG. 4 illustrates step 310 where it is determined whether controlling of the operation of the transceiver 212 is needed on the basis of the measured output signal strength of the transceiver 212 and the measured DVB-H signal strength. In this example, the cellular system is GSM and the antenna isolation is assumed to be 18 dB between antennas 200 and 210.

The measured DVB-H signal level in dBm is presented on the horizontal x-axis of the chart in FIG. 4. The measured output signal strength of a transceiver 212 in dBm is presented on the vertical y-axis of the chart in FIG. 4. The line 400 illustrates is a reference value, which determines whether controlling of the transmission of the transceiver 212 is required. The chart is calculated using a given DVB-H modulation and coding method, and given antenna isolation. If the measured DVB-H signal level and the measured output signal strength of a cellular transmitter plotted on the chart reside within triangle 402 limited by line 400 then transmission of the transceiver 212 interferes with DVB-H reception.

For example, if the DVB-H signal level is above approximately −50 dBm, the cellular transmission cannot interfere with the DVB-H reception. If the DVB-H signal level is −65 dBm, the cellular transmission interferes with the DVB-H reception if the output signal strength is above 25 dBm.

In an embodiment, the antenna isolation between antennas 200 and 210 is measured during the operation of the device. The isolation may change in time. For example, if the user places a hand on of top of the antennas 200 or 210 then the antenna isolation between the antennas changes. If the mobile terminal with DVB-H is a clam shell phone, then the usage of the mobile terminal may change the antenna isolation between antennas 200 and 210. The antenna isolation in closed and open positions is different if the antennas 200 and 210 are placed to different parts of the clam shell terminal.

Figure 5:
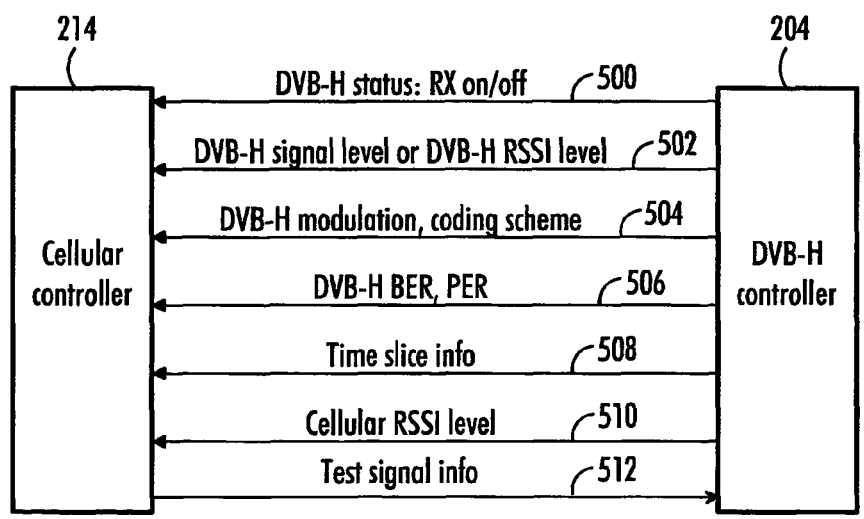
FIG. 5 illustrates an example of information transfer between controllers of a mobile terminal.

In an embodiment, the first controller 204 sends information to the second controller 214. FIG. 5 illustrates an example of the information transfer between the first controller 204 and the second controller 214. The first controller 204 may send the second controller 214 a signal 500 informing when the DVB-H receiver is in active state and receiving a DVB-H signal. Thus, referring to FIG. 1, a signal 500 is sent during the reception of bursts 100, 102.

The first controller 204 may send the second controller 214 a signal 502 comprising information about the DVB-H signal level or DVB-H RSSI level. The information may be the signal level at which the previous burst was received or the signal level at which a burst is currently being received. This information may be utilized in determining whether or not the cellular transmission interferes with the DVB-H signal reception.

The first controller 204 may send the second controller 214 a signal 504 comprising information about the DVB-H modulation and coding parameters used, such as the coding rate and the used modulation method (QPSK/16QAM/64QAM). This information may also be utilized in determining whether or not the cellular transmission interferes the DVB-H signal reception.

For the same purpose, the first controller 204 may send the second controller 214 a signal 506 comprising information about DVB-H signal quality such as the DVB-H BER (Bit Error Rate) and PER (Packet Error Rate). If the DVB-H signal level and signal quality are good, no need exists to limit the cellular transmission.

The first controller 204 may send the second controller 214 a signal 508 comprising information about the DVB-H timeslicing parameters used. These parameters indicate the period of time the DVB-H Receiver is in OFF state 102 and the period of time for which the receiver is in ON state 100, 102. Information about the time between DVB-H bursts may be utilized in controlling the cellular transceiver 212.

The first controller 204 may send the second controller 214 a signal 510 comprising information about the RSSI level of the cellular transmission measured by the DVB-H receiver. This information may be utilized in determining antenna isolation. In an embodiment, antenna isolation is dynamically taken into account in determining whether or not the cellular transmission interferes with the DVB-H signal reception.

In an embodiment, the second controller 214 may inform 512 the first controller 204 when cellular transmitter is transmitting a test signal tone for antenna isolation measurement. The second controller 214 may inform the first controller at which frequency the test signal is transmitted and at which power level. The transmitter 212 may transmit the calibration test tone signal at the reception band of the receiver 202. In another embodiment, the transmitter 212 transmits the test tone signal outside of the reception band of the receiver 202 and the attenuation of the receiver 202 to the test signal frequency is taken into account when the received signal strength is measured.

In an embodiment, the first controller 204 sends at least some of the above signals to the second controller 214 every time the DVB-H receiver changes its state from ON state to OFF state or vice versa. In an embodiment, the signals are sent continuously. Thus, signal strength information is always available for the second controller, for example. In an embodiment, the second controller 214 polls the first controller 204 for the information. This reduces power consumption, as no information is required when the cellular transmitter is not in active state or powered down, for example.

In an embodiment, the DVB-H signal power is measured. If the power level is above a given reference value then the operation of transceiver 212 is enabled. If the power level is below the reference value the operation of the transceiver 212 is limited when the DVB-H receiver is in ON state.

There are several ways to control the cellular transceiver if it is determined that control is needed on the basis of the estimated output signal strength of a cellular transmitter and the measured DVB-H signal strength.

In an embodiment, the transceiver 212 may change the system it is connected to. A mobile terminal may comprise a transceiver that may be configured to communicate with more than one cellular system. The mobile terminal may also comprise more than one transceivers, each configured to communicate with one or more cellular systems. Thus, the mobile terminal may be configured to communicate with both GSM and CDMA or WCDMA networks at one or more different frequency bands supported by these networks.

In an embodiment, if a mobile terminal is in a cellular system employing continuous time transmission (CDMA or WCDMA, for example), it is possible to switch to a system using slot based transmission (GSM/GPRS, for example). Furthermore, transmission may be switched to packet mode transmission (GSM/GPRS or EDGE, for example), if possible.

When the mobile terminal is connected to a system utilizing GPRS or EDGE transmission, mode parameters may be changed so that while a DVB-H receiver is in ON state, a cellular transceiver is utilizing only 1/8 slots (or 2/8, 3/8, and so on, if DVB-H signal quality allows it), and when DVB-H is in OFF state, the cellular transceiver is maximizing the data rate.

Mobile terminal transmission in GPRS/EGPRS (EDGE GPRS) is controlled by the network via the usage of USF (Uplink State Flag), which gives the mobile terminal permission to transmit in a following block period (4 consecutive TDMA frames). As multiplexing or sharing of several mobile terminals is an inherent feature of GPRS/EGPRS, it is possible that the terminal in question (in DVB-H ON state) is not continuously allocated transmission 'slots'.

Based on the above, the reduction of transmission rate can also take place in terms of reducing the response rate to the USF's allocated by the network. Furthermore, the selection of the exact amount of skipped USF's can be based on certain characteristics of the GPRS/EDGE transmission (such as dynamic allocation/extended dynamic allocation mode, extended uplink Temporary Block Flow (TBF) mode, GMSK or 8-PSK modulation commanded for the transmission) such that the GPRS/EDGE connection is still kept alive during the DVB-H ON state. In an embodiment, the response rate needs to be tuned such that the mobile terminal transmits GPRS/EDGE data blocks often enough to prevent a base station counter N3101 from expiring. The counter N3101 is explained in more detail in a 3GPP document TS 44.060 available from 3GPP web site. The value for N3101 may depend on the base station manufacturer, and it may vary also based on the used allocation scheme (dynamic/extended dynamic allocation). This mechanism of adjusting the response rate to USF provides a good cellular performance while minimizing interference to DVB-H reception during DVB-H ON state.

If it is not possible to change to a system using slot-based transmission (i.e., the mobile terminal is forced to use CDMA/WCDMA, for example), the data rate (and also the transmission power) may be minimized during DVB-H ON state and maximum needed data rate may be used when DVB-H is in OFF state. This data rate reduction allows the actual transmitted power to be reduced and thus interference to the DVB-H receiver to be minimized.

In an embodiment, the second controller 214 may select a band of radio frequencies to be used by the transceiver 212. If the transceiver is capable of communicating on different frequency bands, and one of those bands is not interfering with the reception of the receiver 202, the transceiver 212 may be switched to that frequency band.

In an embodiment, the transceiver 212 is operated in a discontinuous transmission mode when the DVB-H receiver 202 is in ON state. Discontinuous transmission is a feature implemented in some communication systems in order to conserve power consumption of mobile devices. GSM is an example of such a system. Discontinuous transmission is typically used in normal speech calls. When a user is not speaking, the transmitter ceases to send normally. Instead, the transmitter sends so-called comfort noise information at given intervals and ceases to transmit otherwise.

In conventional discontinuous transmission solutions, a transceiver comprises a voice activity detector which detects that the user is not speaking. After a given time period (so-called hangover period), the transceiver sends an indicator to the receiver receiving the transmission that the transceiver is initiating discontinuous transmission. The transceiver sends comfort noise packets at given intervals to the receiver. On the basis of the comfort noise packets, the receiver generates suitable background noise, as total silence in the earphone of the receiver may be uncomfortable for the user. The interval between the comfort noise packets may vary depending on the system or speech codec used. For example, in GSM the interval may be 480 ms or 160 ms. Both of these approaches are appropriate for protecting the DVB-H reception from cellular interference. This is based on the fact that interference from one cellular burst does not degrade the DVB-H reception if it occurs rarely.

In an embodiment, the discontinuous transmission mode is used for providing interference-free reception for the DVB-H receiver 202. If it is determined that controlling of the transmission of the transceiver 212 is needed on the basis of the measured output signal strength of the transceiver 212 and the measured DVB-H signal strength the discontinuous transmission mode may be initiated in the transceiver 212. Several alternatives exist to implement the discontinuous transmission.

In an embodiment, discontinuous transmission mode is initiated and ended on the basis of a signal from the first controller 204 informing when the DVB-H receiver is in ON state and receiving a DVB-H signal and when the DVB-H receiver is in OFF state.

Figure 6A:
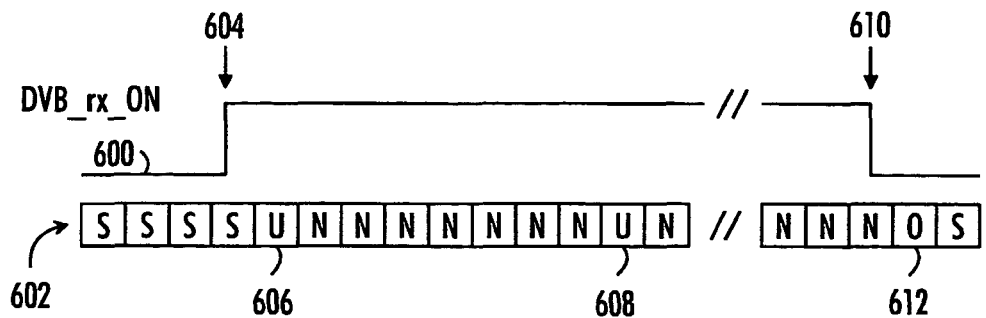
FIGS. 6A and 6B illustrate and example of a discontinuous transmission mode.

FIG. 6A illustrates an example of this embodiment. Line 600 illustrates a signal provided by the first controller 204 indicating the state of the DVB-H receiver and the slotted transmission 602 of the second transceiver 212. The signal goes up at time instant 604 when the DVB-H reception starts. In the slotted transmission 602 of the second transceiver 212, 'S' denotes normal transmission. As the second controller 214 detects that DVB-H reception has started, the controller initiates the discontinuous transmission mode by setting the voice codec of the transceiver 212 to send a comfort noise (denoted with 'U') packet 606 immediately, without any hangover period. After the comfort noise packet, the transceiver 212 transmits no data (denoted with 'N') until it is time to transmit another comfort noise packet 608. The transmission of comfort noise packets is continued until the signal 600 indicates that the DVB-H receiver is in ON state. When the second controller 214 detects from the signal 600 that the DVB-H receiver has moved to OFF state at time instant 610, the controller controls the transceiver to send a packet 612 indicating that the discontinuous transmission ends (denoted with 'O'). Then, the normal transmission is resumed.

In an embodiment, the discontinuous transmission mode is initiated and ended on the basis of the DVB-H time-slicing parameter information sent by the first controller 204. On the basis of the information, the second controller knows beforehand when the DVB-H receiver moves from OFF state to ON state and vice versa. The benefit in this solution is that the comfort noise packets can be generated before the DVB-H ON state begins, and normal transmission may be continued immediately after the DVB-H burst ends.

Figure 6B:
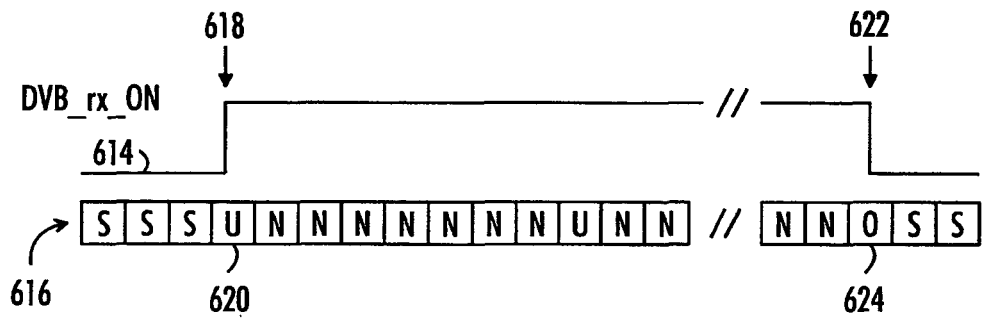

FIG. 6B illustrates this embodiment. Line 614 indicates the DVB-H state and the slotted transmission 616 of the second transceiver 212.

As the DVB-H receiver moves to ON state at time instant 618, the second transceiver starts discontinuous transmission by sending a comfort noise packet 620 immediately. Compared to the embodiment of FIG. 6A, it can be seen that the discontinuous transmission starts a slot earlier. Respectively, when the DVB-H receiver moves to OFF state at time instant 622, the second transceiver may send a packet 624 indicating that the discontinuous transmission ends earlier compared to FIG. 6A.

In an embodiment, the duration of the ON/OFF states is not transmitted by the first controller. The second controller may determine the duration times from the ON/OFF signals described in connection with FIG. 6A. When a DVB-H receiver goes to ON state for the first time, a first timer (DVB-H burst) is started. When a DVB-H receiver goes to OFF state, this first timer (DVB-H burst) is stopped and a second timer (DVB-H idle) is started. When the DVB-H receiver goes to ON state again, this second timer (DVB-H idle) is stopped. Because DVB-H is using fixed time-slicing parameters (within the same network), the second controller can generate the clock internally and start and stop comfort noise generation based on this internal clock. To avoid drifting of clock the internal clock of the second controller must, once in a while, be synchronized with the DVB-H ON/OFF signal.

Alternative methods exist to generate valid comfort noise packets artificially. In an embodiment, the last transmitted comfort noise packet is stored in a memory of the second controller 214. When DVB-H is activated, the stored comfort noise packet is read from the memory. Normal audio input is disabled by turning off the A/D-converter of the microphone of the user interface 206, for example. The stored packet is used while the DVB-H is in ON state. When true comfort noise is available the value in the memory may be updated. This embodiment is fast, as it does not require any time to sample audio input for a comfort noise packet.

Figure 7:
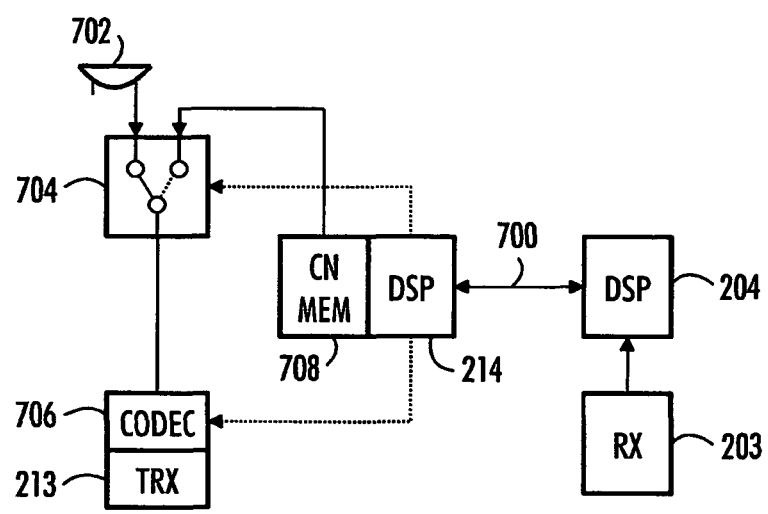
FIG. 7 illustrates an example of comfort noise packets generation.

FIG. 7 illustrates this implementation of the comfort noise generation. The first controller 204 starts receiving DVB-H signal with the first RF-circuitry 203, and sends a notification 700 of the reception to the second controller 214. Assume in this example that speech transmission is ongoing. The microphone 702 of the user interface 206 is connected via a switch 704 to a speech codec 706 and further to the second RF-circuitry 213. As the second controller receives the notification 700 about the DVB-H reception, it reads the last previously transmitted comfort noise packet from a memory 708 and controls the switch 704 to connect the comfort noise packet to the codec 706.

In another embodiment, thermal noise is used for generating comfort noise packets. When, for example, the A/D-converter of the microphone of the user interface 206 is turned off, thermal noise will appear at the input of the codec. This can be used for building up the comfort noise packets. This option requires 20 ms sampling and causes at least such a 20 ms latency when discontinuous transmission mode is initiated. Also in this embodiment, the last transmitted comfort noise packet generated form thermal noise may be stored for future used. This way the sampling delay may be avoided.

If the user is speaking when discontinuous transmission mode is initiated in the mobile terminal the speech packets are discarded. In a non-real-time data connection transmission was ongoing, the data packets may be delayed. Let us study an embodiment where the transceiver 212 is in a WCDMA network, and either short messages or other data need to be transmitted simultaneously with DVB-H reception. This may be the case when a DVB-H return channel is needed, for example.

In addition to continuous speech transmission, WCDMA systems provide slotted uplink channels which are used for relatively small amounts of burst mode data. Such channels include Random Access Channel (RACH) and Common Packet Channel (CPCH).

A Random Access Channel RACH is typically used for transmission of initial access bursts or non-real-time dedicated control data. RACH is always received from the entire cell. RACH is characterized by collision risks and by being transmitted using open loop power control. A mobile terminal may decide the transmission starting point (within a RACH frame structure). The transmission comprises a preamble and a message part. Acquisition indication and retransmission procedures are used. A mobile terminal is to repeat transmitting preambles until a ACK/NACK on a return channel from the base station has been received or the maximum number of preambles has been reached. The message part is either 10 ms or 20 ms. A 10 ms message part consists of 150, 300, 600 or 1200 bits, depending on the spreading factor of 256, 128, 64, or 32 used, respectively.

Figure 8A:
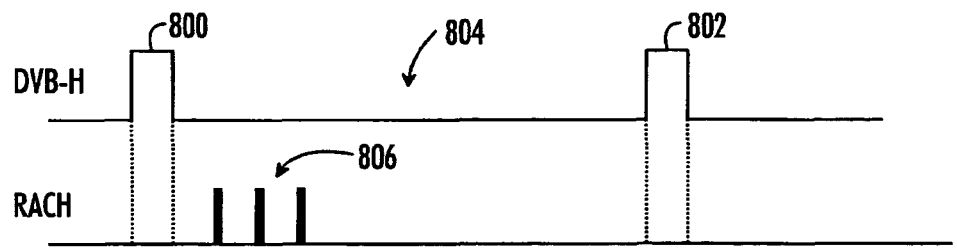
FIGS. 8A and 8B illustrate a use of a random access channel for data transmission.

In an embodiment, a mobile terminal uses Random Access Channel RACH for short message or data transmission during DVB-H reception when a DVB-H receiver is in OFF state. FIG. 8A illustrates this embodiment. FIG. 8A shows a section of the DVB-H signal comprising two bursts 800, 802 and an OFF period 804. The burst duration is between 100 to 500 ms and the length of the OFF period is typically between 1500 to 2500 ms, depending on the system parameters. Below the DVB-H signal is the random access channel. The duration of each RACH burst is approximately 31 ms. Sending, for example, 5000 bits requires 2 to 3 bursts 806. As the DVB-H OFF period is considerably longer, it is possible to schedule the transmission of RACH bursts in such a manner that they do not overlap with the DVB-H bursts. This requires synchronization between the DVB-H receiver and the cellular transceiver, but the synchronization requirements are not strict.

Figure 8B:
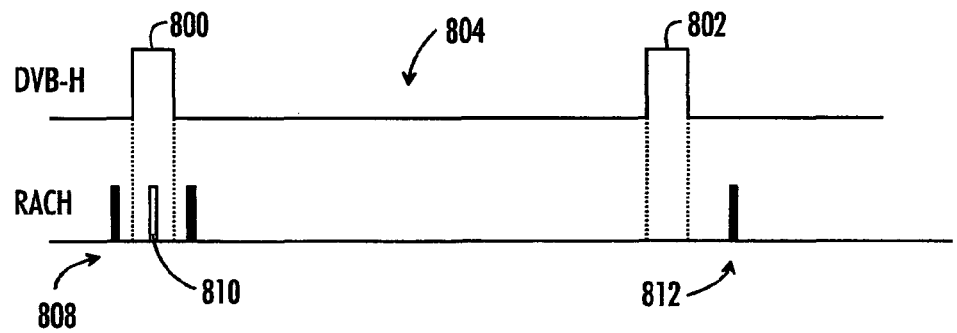

In an embodiment, a mobile terminal uses Random Access Channel RACH for short message or data transmission during DVB-H reception but without synchronization with the DVB-H receiver. In this case, the transmission on RACH is disabled when DVB-H is in ON state. A probability of a successful transmission without overlap with the DVB-H reception is approximately 70 to 80%. FIG. 8B illustrates this embodiment. FIG. 8B shows a section of the DVB-H signal comprising two bursts 800, 802 and the OFF period 804. Below the DVB-H signal is the random access channel. A mobile terminal transmits a group of bursts 808. Part 810 of the bursts overlaps with the reception of a DVB-H burst 800. Thus, the transmission of these bursts is disabled and the transmission is unsuccessful. The mobile terminal transmits the blocked bursts again later 812, and this time the transmission is successful.

A Common Packet Channel CPCH is a contention-based channel used for transmission of burst mode data traffic. CPCH is shared by mobile terminals in a cell and therefore, it is a common resource. CPCH is fast power controlled. CPCH is an extension to the RACH channel for packet-based user data. The transmission consists of one or several Access Preambles [A-P] of a length of 4096 chips, one Collision Detection Preamble (CD-P) of a length of 4096 chips, a DPCCH Power Control Preamble (PC-P) which is either 0 slot or 8 slots in length, and a message of a variable length of N×10 ms. Each 10 ms message part consists of 150, 300, 600, 1200, 2400, 4800 or 9600 bits, corresponding to spreading factors of 256, 128, 64, 32, 16, 8, 4, respectively.

Figure 8C:
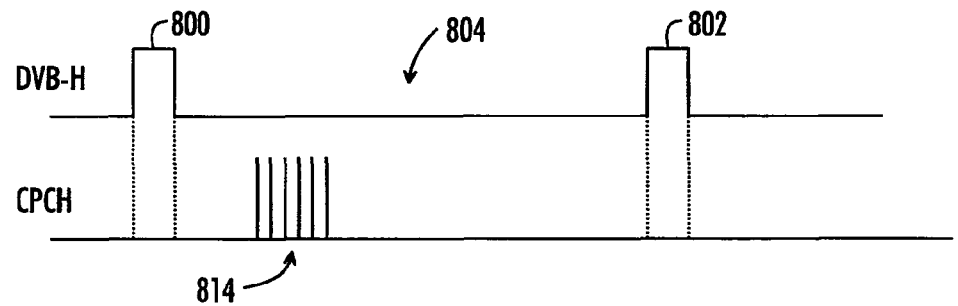
FIGS. 8C and 8D illustrate a use of a common packet channel for data transmission.

In an embodiment, a mobile terminal uses Common Packet Channel CPCH for short message or data transmission during DVB-H reception when DVB-H receiver is in OFF state. FIG. 8C illustrates this embodiment. FIG. 8A shows a section of a DVB-H signal comprising two bursts 800, 802 and the OFF period 804. The burst duration is between 100 to 500 ms and the length of the OFF period is typically between 1500 to 2500 ms, depending on the system parameters. Below the DVB-H signal is the Common Packet Channel. Sending, for example, 5000 bits requires 1 to 34 message parts, each of a length of 10 ms, depending on the spreading factor. Including preambles the total burst 814 length is 25 to 400 ms. As the DVB-H OFF period is considerably longer, it is possible to schedule the transmission of CPCH bursts in such a manner that they do not overlap with the DVB-H bursts. This requires synchronization between the DVB-H receiver and the cellular transceiver, but the synchronization requirements are not strict.

Figure 8D:
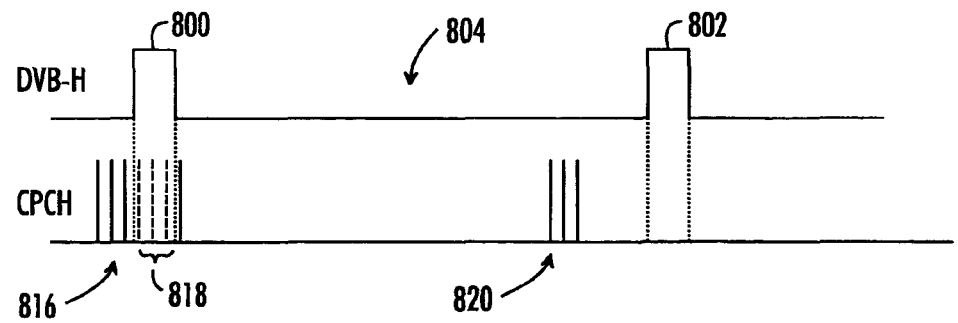

In an embodiment, a mobile terminal uses Common Packet Channel CPCH for short message or data transmission during DVB-H reception but without synchronization with the DVB-H receiver. In this case, the transmission on CPCH is disabled when DVB-H is in ON state. A probability of a successful transmission without overlap with the DVB-H reception is approximately 50 to 80%. FIG. 8D illustrates this embodiment. FIG. 8D shows a section of the DVB-H signal comprising two bursts 800, 802 and the OFF period 804. Below the DVB-H signal is the Common Packet Channel. A mobile terminal transmits a group of bursts 816. Part 818 of the bursts overlaps with the reception of a DVB-H burst 800. Thus, the transmission of these bursts is disabled and the transmission is unsuccessful. The mobile terminal transmits the blocked bursts again later 820, and this time the transmission is successful.

Let us study an embodiment, where a transceiver 212 is in a GSM network, and either short messages or other data need to be transmitted simultaneously with DVB-H reception. This may be the case when a DVB-H return channel is needed, for example.

Figure 9A:
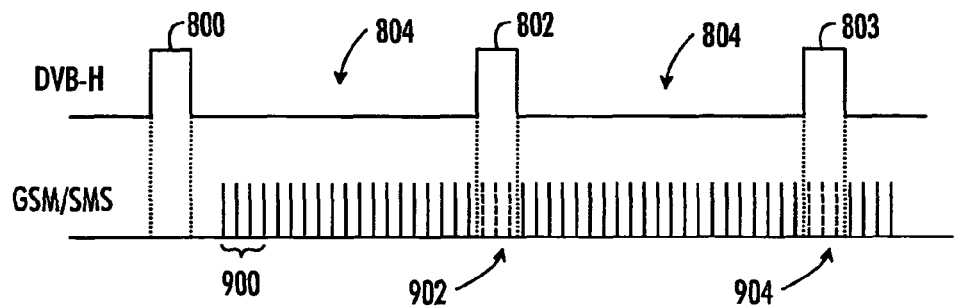
FIGS. 9A and 9B illustrate a use of short messages and GPRS.

In GSM, a typical duration for a short message transmission is 4 to 6 seconds, depending on the length of the message. A Stand-alone Dedicated Control Channel (SDCCH) is typically used for short message transmission. In the beginning, Random Access Channel (RACH) is used for connection establishment. FIG. 9A illustrates an embodiment. FIG. 9A shows a section of the DVB-H signal comprising bursts 800 to 803 and OFF periods 804. The burst duration is between 100 to 500 ms and the length of the OFF period is typically between 1500 to 2500 ms, depending on the system parameters. Below the DVB-H signal is the short message transmission.

Transmission 900 on the random access channel (connection establishment) at the beginning of the GSM/SMS transmission must not be affected. This requires synchronization between the DVB-H receiver and the cellular transceiver, but the synchronization requirements are not strict. Transmission 902, 904 overlapping DVB-H ON states is disabled. Disablement of transmission leads to GSM re-transmissions, but not to data errors or missed packets (assuming SDCCH is used).

In an embodiment, where Fast Associated Control Channel (FACCH) or GSM circuit switched CS data (CSD) is used, similar method of blanking the transmission can be used, as the retransmission protocol (LAPDm and RLP, respectively) take care of retransmission of data when unacknowledged by a peer entity in the network. The retransmission can take place during DVB-H OFF state or during the DVB-H ON period with limited transmission rate (every nth SDCCH/SACCH/FACCH/TCH block period).

Figure 9B:
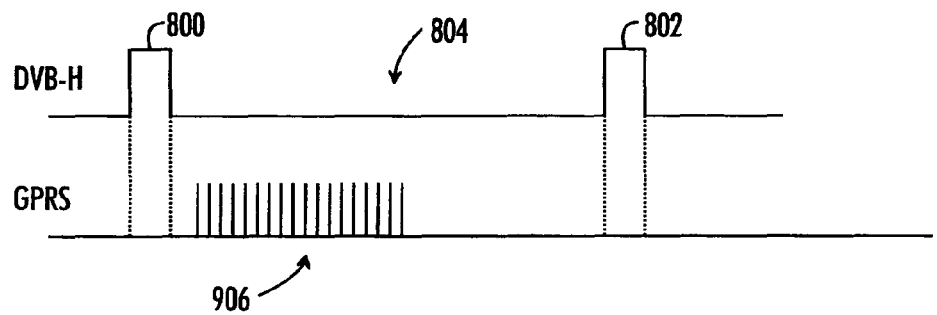

In an embodiment, General Packet Radio Service (GPRS) is used for transferring data simultaneously with DVB-H reception. GPRS is a packet based mobile data service available in many GSM networks. FIG. 9B shows a section of the DVB-H signal comprising two bursts 800, 802 and the OFF period 804. Below the DVB-H signal is the GPRS transmission. GPRS transmission 906 is performed when a DVB-H receiver is in OFF state. The estimated duration of the transmission 906 is 300 ms to 1 s, depending on the data amount and network conditions. This requires synchronization between the DVB-H receiver and the cellular transceiver, but the synchronization requirements are not strict.

In an embodiment, signaling between a mobile terminal and a base station of a cellular system is timed in such a manner that interference to DVB-H reception is minimized. There are several events which may occur simultaneously during DVB-H signal reception. Examples of such events include mobile terminated and mobile originated voice calls, mobile terminated and mobile originated multimedia messages, mobile terminated and mobile originated short messages, mobile terminated push-email, mobile originated multimedia message/email/channel subscription and mobile originated browsing.

Figure 10A:
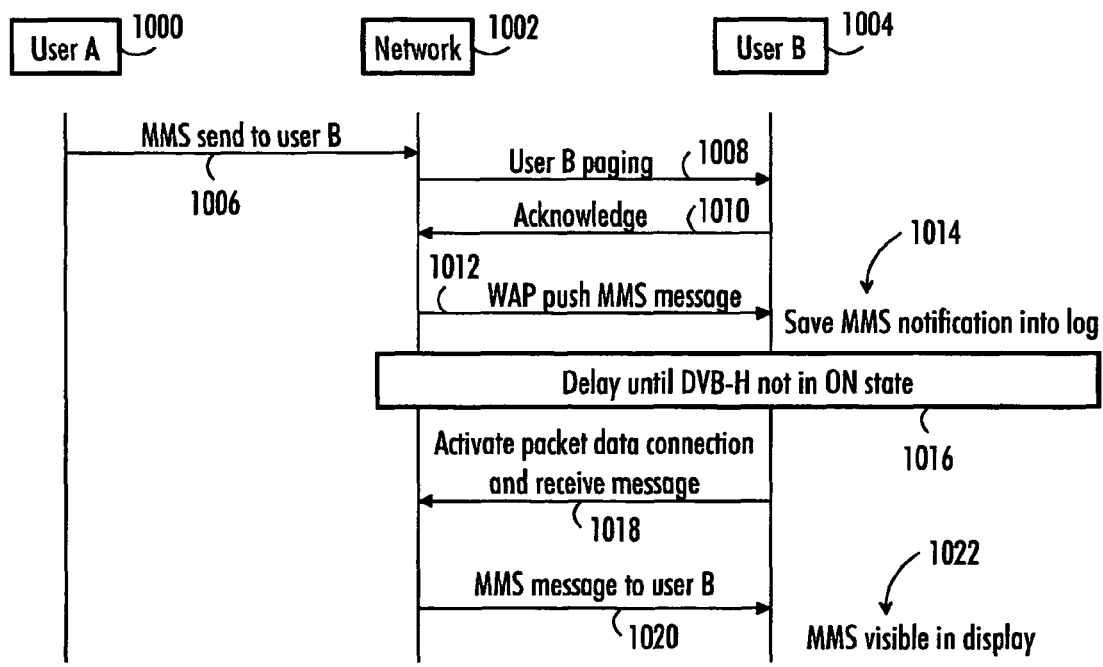
FIG. 10A illustrates reception of a mobile terminated multimedia message.

FIG. 10A is a signal chart illustrating reception of a mobile terminated multimedia message. A mobile terminal 1000 of User A is sending a multimedia message (MMS) via a network 1002 to a mobile terminal of 1004 User B, which is receiving a DVB-H transmission. First, the mobile terminal of User A sends an MMS 1006 to the network 1002. The network pages 1008 the mobile terminal of User B. The second controller 214 of the mobile terminal 1004 acknowledges 1010 a paging message. The network sends a WAP push MMS message 1012 to the terminal 1004. The second controller 214 of the mobile terminal of User B saves 1014 a notification of the MMS into a log file, and delays 1016 further transmission until a DVB-H receiver is in OFF state. When the second controller 214 either receives information from the first controller 204 indicating that the DVB-H receiver is in OFF state or determines the same information from time-slicing parameters, the second controller activates 1018 a packet data connection and reception of the message. After such activation, the network sends 1020 the MMS to the mobile terminal 1004. The MMS is visible 1022 on a display of the mobile terminal.

A push email may be received in the same manner. The reception of a short message may also be performed in a similar manner. In such a case, the mobile terminal 1004 may delay an acknowledgement message after receiving the short message.

The transmission of a mobile originated short message may be delayed until the DVB-H receiver is in OFF state.

Figure 10B:
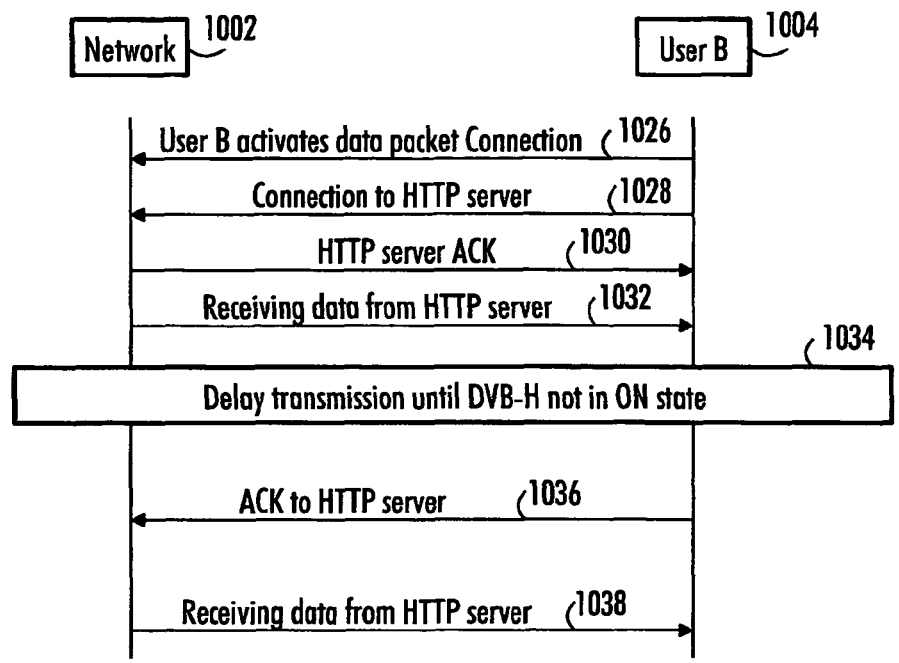
FIG. 10B illustrates implementation of mobile originated browsing.

FIG. 10B is a signal chart illustrating the implementation of mobile originated browsing. The mobile terminal 1004 of User B is receiving a DVB-H transmission. Simultaneously, the user wishes to browse the Internet. On the basis of a command received from the user, the second controller 214 of the mobile terminal 1004 activates 1026 a data packet connection to the network 1002. A connection to an HTTP server is established 1028. The HTTP server sends an acknowledgement 1030 and data 1032. The second controller 214 of the mobile terminal of User B delays 1034 further transmission until the DVB-H receiver is in OFF state. When the DVB-H is in OFF state, the second controller 214 of the mobile terminal 1004 sends an acknowledgement 1036 to the HTTP server. The HTTP then sends 1038 more data to the mobile terminal 1004.

Figure 10C:
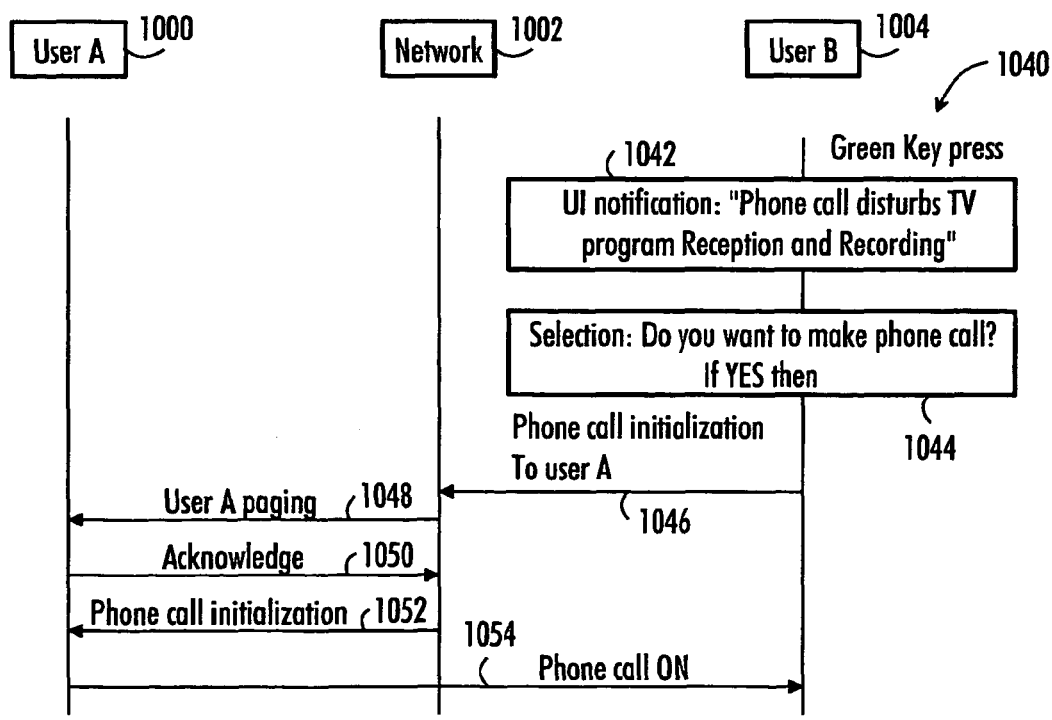
FIG. 10C illustrates an embodiment where a user is notified about possible interference.

In an embodiment, the second controller of the device is configured to notify the user of the device before a large amount of data is transmitted or received. FIG. 10C is a signal chart illustrates this embodiment. The mobile terminal 1004 of User B is receiving a DVB-H transmission. Simultaneously, the user wishes to make a phone call to User A of a mobile terminal 1000. when a press of a phone call initiation key is detected 1040, the second controller of the mobile terminal 1004 displays 1042 a message on a display of the terminal. The message informs the user that a phone call may interfere with the DVB-H reception. The user is presented 1044 with a selection to continue or cancel. Upon a continue command, phone call initialization 1046 is performed. The network 1002 pages 1048 the terminal 1000 of User A. After the terminal 1000 has acknowledged 1050 the network initializes 1052 the phone call and the call may begin 1054.

Embodiments of the invention may be realized in an electronic device comprising one or more controllers, a receiver and a transceiver. A controller may be configured to perform at least some of the steps described in connection with the above-described figures and flowcharts together with the receiver and the transceiver. The embodiments may be implemented as a computer program comprising instructions for executing a computer process for operating a multi-service receiver comprising a receiver coupled to a first antenna in combination with a transceiver coupled to a second antenna, the process comprising: receiving information in bursts on a first band of radio frequencies; measuring signal strength of the received information; comparing the measured signal strength to a reference value; and if the measured signal strength is above the reference value, enabling operation of a transceiver; and if the measured signal strength is below the reference value, limiting the operation of the transceiver during reception of the bursts.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. In a device comprising a coupling to a first antenna and a second antenna, a method for operating a receiver comprising a coupling to the first antenna in combination with a transmitter comprising a coupling to the second antenna, the method comprising:
   receiving information in bursts with the receiver on a first band of radio frequencies,
   measuring signal strength of the information received with the receiver,
   comparing the measured signal strength to a reference value, and
   if the measured signal strength is above the reference value, enabling operation of the transmitter, and
   if the measured signal strength is below the reference value, limiting operation of the transmitter during reception of the bursts,
   wherein the transmitter is in a GSM network, the method further comprising:
   configuring the transmitter to send data as short messages and interrupting transmission when the receiver is receiving bursts.

2. In a device comprising a coupling to a first antenna and a second antenna, a method for operating a receiver comprising a coupling to the first antenna in combination with a transmitter comprising a coupling to the second antenna, the method comprising:

receiving information in bursts with the receiver on a first band of radio frequencies, measuring signal strength of the information received with the receiver, comparing the measured signal strength to a reference value, and if the measured signal strength is above the reference value, enabling operation of the transmitter, and if the measured signal strength is below the reference value, limiting operation of the transmitter during reception of the bursts, wherein the transmitter is in a GSM network, the method further comprising:

configuring the transmitter to send data using GPRS, and timing the transmission to time instants at which the receiver is not receiving bursts.

3. In a device comprising a coupling to a first antenna and a second antenna, a method for operating a receiver comprising a coupling to the first antenna in combination with a transmitter comprising a coupling to the second antenna, the method comprising:

receiving information in bursts with the receiver on a first band of radio frequencies, measuring signal strength of the information received with the receiver, comparing the measured signal strength to a reference value, and if the measured signal strength is above the reference value, enabling operation of the transmitter, and if the measured signal strength is below the reference value, limiting operation of the transmitter during reception of the bursts, wherein the step of limiting the operation of the transmitter during reception of the bursts comprises:

delaying signaling of the transmitter to a time instant at which a burst is not being received.

4. In a device comprising a coupling to a first antenna and a second antenna, a method for operating a receiver comprising a coupling to the first antenna in combination with a transmitter comprising a coupling to the second antenna, the method comprising:

receiving information in bursts with the receiver on a first band of radio frequencies, measuring signal strength of the information received with the receiver, comparing the measured signal strength to a reference value, and if the measured signal strength is above the reference value, enabling operation of the transmitter, and if the measured signal strength is below the reference value, limiting operation of the transmitter during reception of the bursts, the method further comprising: notifying a user of the device before a large amount of data is about to be transmitted or received.

5. In a device comprising a coupling to a first antenna and a second antenna, a method for operating a receiver comprising a coupling to the first antenna in combination with a transmitter comprising a coupling to the second antenna, the method comprising:

receiving information with the receiver on a first band of radio frequencies;

transmitting information from the transmitter in a second band of radio frequencies;

measuring signal strength of the information received with the receiver;

measuring output signal strength of the transmitter;

determining a difference in measured signal strengths; and controlling the transmitter on the basis of the determination.

\* \* \* \* \*